US008300034B2

(12) United States Patent
Park

(10) Patent No.: US 8,300,034 B2
(45) Date of Patent: Oct. 30, 2012

(54) DRIVE CIRCUIT AND LIQUID CRYSTAL DISPLAY APPARATUS INCLUDING THE SAME

(75) Inventor: Jae-Ho Park, Youngin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 1119 days.

(21) Appl. No.: 12/187,409

(22) Filed: Aug. 7, 2008

(65) Prior Publication Data

US 2009/0040202 A1 Feb. 12, 2009

(30) Foreign Application Priority Data

Aug. 10, 2007 (KR) ........................ 10-2007-0080596

(51) Int. Cl.
*G09G 5/00* (2006.01)
*G06F 3/038* (2006.01)

(52) U.S. Cl. .......................................... 345/204; 345/90

(58) Field of Classification Search .............. 345/87–90, 345/96, 204, 209, 690
See application file for complete search history.

(56) References Cited

U.S. PATENT DOCUMENTS

| | | | | |
|---|---|---|---|---|
| 4,686,426 | A * | 8/1987 | Fujioka et al. | 315/169.3 |
| 4,982,183 | A * | 1/1991 | Flegal et al. | 345/79 |
| 5,410,219 | A * | 4/1995 | Takei et al. | 315/169.4 |
| 6,181,306 | B1 * | 1/2001 | Specty et al. | 345/63 |
| 7,158,127 | B1 * | 1/2007 | Dotson | 345/204 |
| 7,907,133 | B2 * | 3/2011 | Joffer et al. | 345/204 |
| 2004/0017365 | A1 * | 1/2004 | Hatano et al. | 345/204 |
| 2010/0265168 | A1 * | 10/2010 | Neugebauer | 345/87 |
| 2010/0289786 | A1 * | 11/2010 | Tanaka et al. | 345/209 |

FOREIGN PATENT DOCUMENTS

| | | |
|---|---|---|
| JP | 05-100209 | 4/1993 |
| JP | 09-127920 | 5/1997 |
| JP | 2001-042842 | 2/2001 |
| JP | 2005-266366 | 9/2005 |

* cited by examiner

*Primary Examiner* — Joe H Cheng
(74) *Attorney, Agent, or Firm* — Volentine & Whitt, PLLC

(57) ABSTRACT

A drive circuit for a liquid crystal display (LCD) panel is provided, where the LCD panel includes a plurality of pixels located at intersection regions of a plurality of gate lines and a plurality of data lines. The drive circuit includes a gate line drive unit and a data line drive unit. The gate line drive unit is configured to simultaneously enable two of the plurality of gate lines during each of successive horizontal scanning periods, where the two gate lines enabled during a horizontal scanning period are interleaved with the two gate lines enabled during a next horizontal scanning period. The data line drive unit configured to apply gray-scale voltages corresponding to image data to the plurality of data lines.

11 Claims, 6 Drawing Sheets

DRIVE CIRCUIT AND LIQUID CRYSTAL DISPLAY APPARATUS INCLUDING THE SAME

PRIORITY STATEMENT

A claim of priority under 35 USC §119 is made to Korean Patent Application No. 2007-0080596, filed Aug. 10, 2007, in the Korean Intellectual Property Office (KIPO), the contents of which are herein incorporated by reference in their entirety.

BACKGROUND

Example embodiments of the present invention relate to a liquid crystal display (LCD) apparatus and to a drive circuit which may be included in an LCD apparatus.

LCD devices typically include a pair of confronting transparent substrates which define a narrow gap therebetween, and a liquid crystal layer with dielectric anisotropy contained within the gap. In addition, field-generating electrodes oppose each other on inner surfaces of the respective substrates to define a matrix of pixels therebetween. Voltages applied to the field-generating electrodes produce an electric field in the liquid crystal layer to control optical properties (e.g., transmttance) of the liquid crystal layer. A desired image is displayed on the LCD device by controlling, on a pixel by pixel basis, the voltages applied to the field-generating electrodes.

In an LCD device, scan lines usually refer to lines used to supply gate selection signals, and data lines usually refer to lines used to supply color data (e.g., RGB data). For example, scan lines (gate lines) may extend in a row direction of the pixel matrix, and data lines may extend in a column direction of the pixel matrix. Each pixel of the LCD device includes a switching element such as thin-film transistor (TFT) connected to one of the gate lines and one of the data lines, and a liquid crystal capacitor which is defined by a pixel electrode, a common electrode opposite thereto and the liquid crystal therebetween.

If a continuous unidirectional electric field is applied to each pixel, precipitation of ionic impurities in the liquid crystal layer onto the adjacent electrodes can occur, thereby causing electrochemical reactions in the electrodes. Thus, in order to avoid such deterioration, the polarity of the voltage applied to each pixel may be periodically reversed. For example, if a pixel is driven by positive voltage in one scanning cycle, it may be driven by a negative voltage in a next scanning cycle. This can be done by periodically reversing the opposite polarities of the common electrode voltage and the voltage of the pixel electrode. The polarities may, for example, be reversed (i.e., inverted) on a frame-by-frame basis (frame inversion method (FIM)), on a line-by-line basis (line inversion method (LIM)), or on a pixel-by-pixel inversion basis (dot inversion method (DIM)).

SUMMARY

According to a non-limiting aspect of the present invention, a drive circuit for a liquid crystal display (LCD) panel is provided, where the LCD panel includes a plurality of pixels located at intersection regions of a plurality of gate lines and a plurality of data lines. The drive circuit includes a gate line drive unit and a data line drive unit. The gate line drive unit is configured to simultaneously enable two of the plurality of gate lines during each of successive horizontal scanning periods, where the two gate lines enabled during a horizontal scanning period are interleaved with the two gate lines enabled during a next horizontal scanning period. The data line drive unit configured to apply gray-scale voltages corresponding to image data to the plurality of data lines.

According to another non-limiting aspect of the present invention, a liquid crystal display (LCD) apparatus is provided which includes an LCD panel, a gate line drive unit, and a data line drive unit. The LCD panel includes a plurality of intersecting gate lines and data lines, and a plurality of pixels respectively located at intersection regions of the plurality of gate lines and data lines. The gate line drive unit is configured to simultaneously enable two of a plurality of gate lines during each of successive horizontal scanning periods, wherein the two gate lines enabled during a horizontal scanning period are interleaved with the two gate lines enabled during a next horizontal scanning period. The data line drive unit configured to apply gray-scale voltages corresponding to image data to the plurality of data lines.

According to yet another non-limiting aspect of the present invention, a liquid crystal display (LCD) apparatus is provided which includes an LCD panel, a data line drive unit, a gate line drive unit, a timing control unit, and a gray-scale voltage generation unit. The LCD panel includes a plurality of intersecting gate lines and data lines, and a plurality of pixels respectively located at intersection regions of the plurality of gate lines and data lines. The data line drive unit is configured to selectively apply gray-scale voltages corresponding to image data to the plurality of data lines. The gate line drive unit is configured to simultaneously enable two of the plurality of gate lines during each of successive horizontal scanning periods in response to a gate control signal, where the two gate lines enabled during a horizontal scanning period are interleaved with the two gate lines enabled during a next horizontal scanning period. The timing control unit is configured to provide the image data to the data line drive unit and the gate control signal to the gate line drive unit. The gray-scale voltage generation unit configured to provide the gray-scale voltages to the data line drive unit.

BRIEF DESCRIPTION OF THE DRAWINGS

Example embodiments will be more clearly understood from the following detailed description taken in conjunction with the accompanying drawings. FIGS. 1 to 6 represent non-limiting, example embodiments as described herein.

FIG. 1 is a circuit diagram illustrating a liquid crystal display (LCD) apparatus according to an example embodiment of the present invention.

FIG. 2 is a schematic illustration of pixels, data lines and gate lines included in an LCD panel of the LCD apparatus of FIG. 1.

FIG. 4 is a timing diagram of gate scan pulses, and first and second panel switching control signals.

FIG. 5 is a circuit diagram illustrating an LCD apparatus according to an example embodiment of the present invention.

FIG. 6 illustrates a source driver included in the data line drive unit and a panel switching unit included in the LCD apparatus of FIG. 5.

DETAILED DESCRIPTION OF THE EMBODIMENTS

Figure 1:
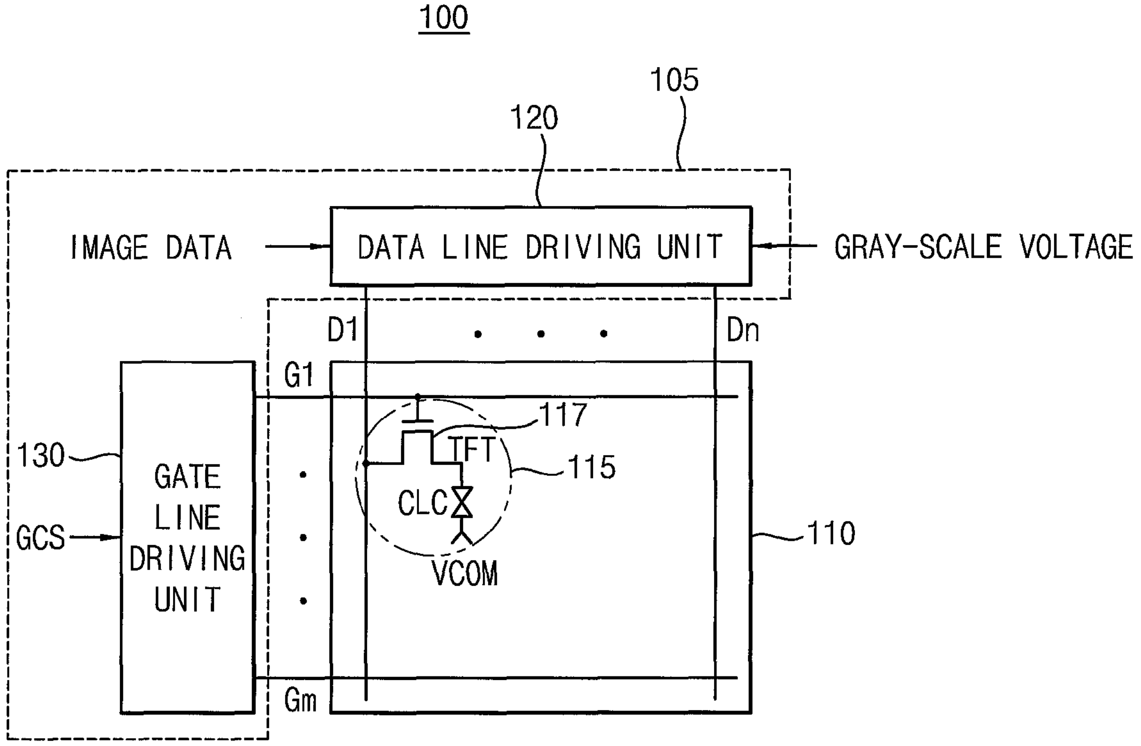

Embodiments of the present invention now will be described more fully with reference to the accompanying drawings, in which embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout this application.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the invention. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a circuit diagram illustrating a liquid crystal display (LCD) apparatus 100 according to an example embodiment of the present invention.

Referring to FIG. 1, the LCD apparatus 100 includes a drive circuit 105 and an LCD panel 110.

The embodiment is not limited to any specific structure of the LCD panel 110. However, in this example, the LCD panel 110 includes two substrates, such as two thin-film transistor (TFT) substrates or two color filter substrates, where one of the two substrates includes a plurality of intersecting gate lines G1, . . . , Gm and a plurality of data lines D1, . . . Dn, and the other of the two substrates includes a common electrode for supplying a common voltage signal VCOM. Each pixel 115 is located in the vicinity of the intersection area of one gate line and one data line, and is electrically defined by a thin film transistor 117 and liquid crystal capacitor CLC connected between VCOM and the transistor 117. Each transistor 117 is responsive to a gate line voltage to selectively electrically connect the liquid crystal capacitor CLC to a corresponding data line.

The drive circuit 105 includes a data line drive unit 120 and a gate line drive unit 130.

The data line drive unit 120 includes a plurality of source drivers (described later herein), and converts image data that is delivered to each pixel of the LCD panel 100 to corresponding voltages, and outputs the corresponding voltages on a data line by data line basis.

The gate line drive unit 130 includes a plurality of source drivers (not illustrated), and controls the gate of each transistor 117 such that the voltages corresponding to image data may be provided to each pixel 115 via a corresponding data line. That is, each pixel 115 is turned on or turned off by each corresponding transistor 117 which operates as a switch in response voltages on the gate lines G1, . . . , Gm.

As will be described in detail later herein, the gate line drive unit 130 is responsive to a gate control signal GCS to simultaneously enable two gate lines in a reference horizontal scanning time Href, where the two gate lines are interleaved with two other gate lines that are enabled in a next reference horizontal scanning time Href.

Figure 2:
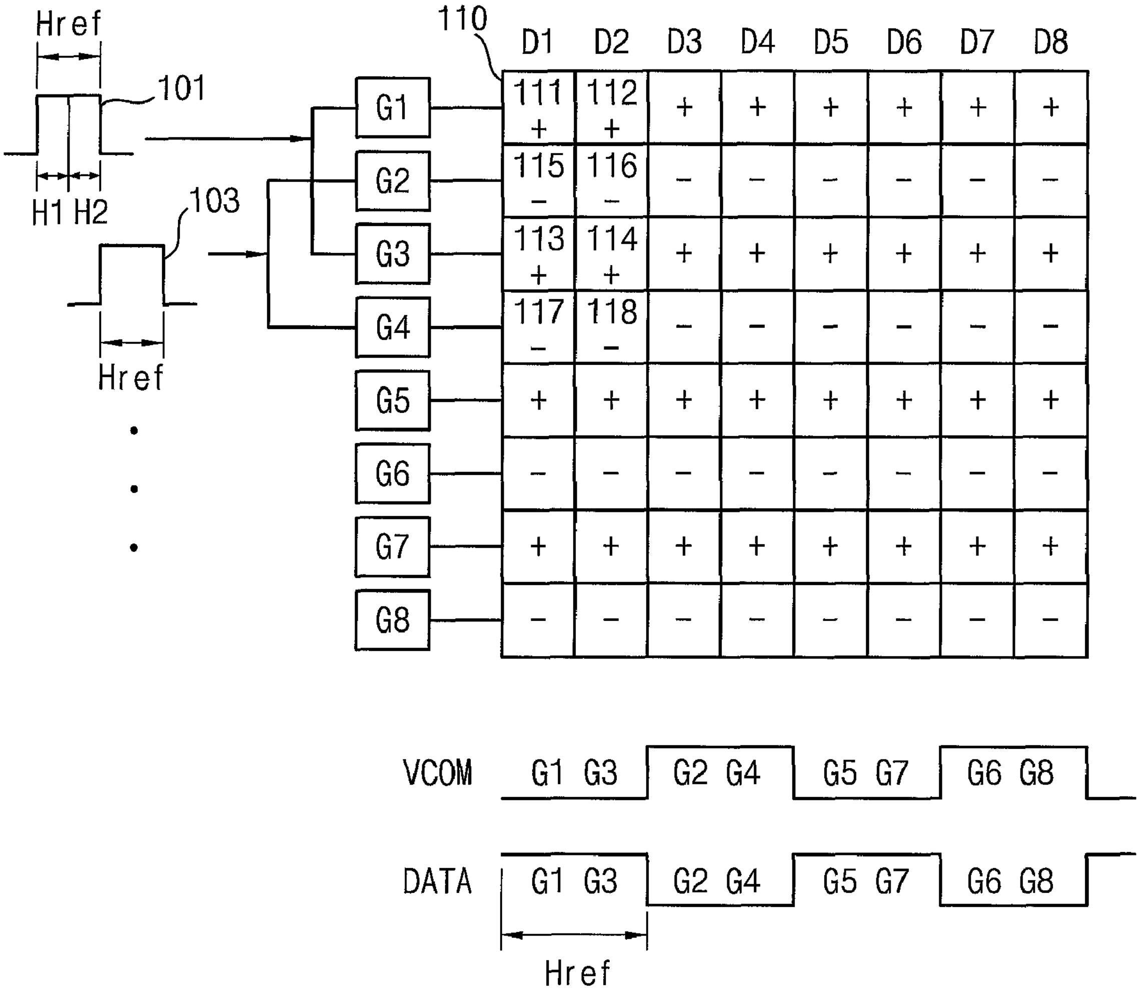

FIG. 2 is a schematic illustration of pixels, data lines and gate lines included in the LCD panel of FIG. 1.

Referring to FIG. 2, the LCD panel 110 of this example includes eight data lines D1, . . . , D8, eight gate lines G1, . . . , G8, and thus sixty-four pixels. The number of data lines and gate lines is merely illustrative for convenience of description and may be varied.

FIG. 2 also illustrates voltage polarities in which the pixels are driven during a given scanning cycle, i.e., pixels in a gate line are driven by a voltage of a first polarity, while pixels in an adjacent gate line are driven by a voltage of a second polarity which is opposite the first polarity. More specifically, in the illustrated example, pixels in the odd-numbered gate lines G1, G3, G5 and G7 are driven by a positive voltage, and pixels in the even-number gate lines G2, G4, G6 and G8 are driven by a negative voltage. In operation, these polarities may be inverted in a next scanning cycle, to thereby avoiding deterioration of the liquid crystal pixels as discussed previously.

Each scanning cycle includes successive reference horizontal scanning periods, and in the non-limiting example of FIG. 2, each scanning cycle includes four (4) successive reference horizontal scanning periods in which pairs of gate lines are enabled.

That is, in a first reference horizontal scanning period Href of the scanning cycle, the gate line drive unit 130 applies a scan pulse 101 to a first pair of gate lines, i.e., a first gate line G1 and a third gate line G3, the pixels of which are driven by a voltage of a first polarity (positive polarity). In a next reference horizontal scanning period Href, the gate line drive unit 130 applies a scan pulse 103 to a second pair of gate lines, i.e., a second gate line G2 and a fourth gate line G4, the pixels of which are driven by a voltage of a second polarity (negative polarity). As shown in FIG. 2, the first pair of gate lines G1 and G3 are interleaved with the second pair of gate lines G2 and G4.

In a next reference horizontal scanning period Href of the scanning cycle, the gate line drive unit 130 applies a scan pulse (not shown) to a third pair of gate lines, i.e., a fifth gate line G5 and a seventh gate line G7, the pixels of which are driven by a voltage of the first polarity (positive polarity). In a next reference horizontal scanning period Href, the gate line drive unit 130 applies a scan pulse (not shown) to a fourth pair of gate lines, i.e., a sixth gate line G6 and an eight gate line G8, the pixels of which are driven by a voltage of the second polarity (negative polarity). As shown in FIG. 2, the third pair of gate lines G5 and G7 are interleaved with the fourth pair of gate lines G6 and G8.

As also shown in FIG. 2, the relative voltage polarities of VCOM and DATA are inverted for each reference horizontal scanning period Href.

Figure 3A:
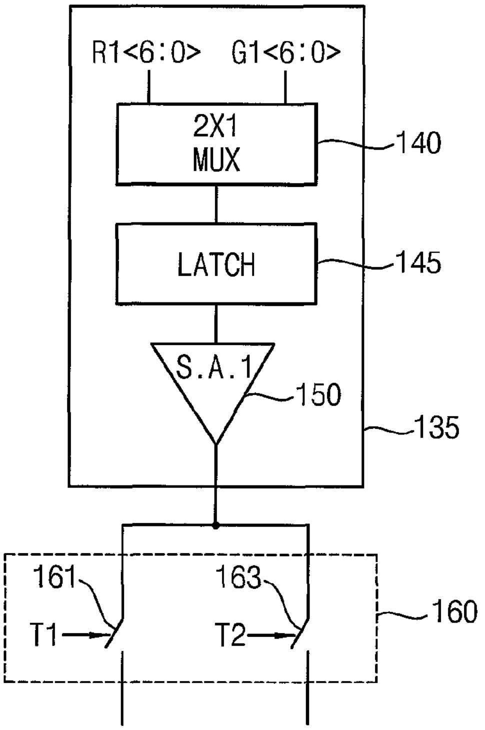
FIGS. 3A and 3B illustrate source drivers and panel switching units included in a data line drive unit of the LCD apparatus of FIG. 1.
Figure 3B:
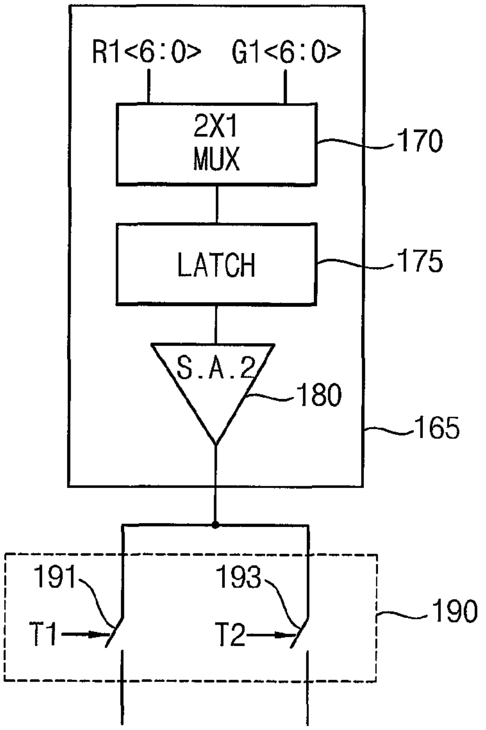

FIGS. 3A and 3B illustrate examples of source drivers 135 and 165, and panel switching units 160 and 190, which may be included in the data line drive unit 120 of FIG. 1.

The source driver 135 in the example of FIG. 3A includes a multiplexer 140, a latch 145 and a source amplifier (S.A.1) 150, and similarly, the source driver 165 of FIG. 3B includes a multiplexer 170, a latch 175 and a source amplifier (S.A.2) 180. Further, panel switching unit 160 includes first and second switches 161 and 163. The panel switching unit 190 includes first and second switches 191 and 193.

Referring to FIGS. 2, 3A and 3B, the source driver 135 and panel switching unit 160 are provided to supply image data to the pixels of data lines D1 and D2 contained in the gate lines G1, G2, G5 and G6. The source driver 165 and panel switching unit 190 are provided to supply image data to the pixels of data lines D1 and D2 contained in the gate lines G3, G4, G7 and G8. Although not shown, similar pairs of source drivers and switching units may be provided for the remaining pairs of data lines D3~D8.

As described above, the specific example of this embodiment includes eight (8) data lines D1~D8. However, each data line D includes two (2) sub-data lines (not shown) which separately connect pixels of the gate lines G1, G2, G5 and G6 to the panel switching unit 160, and pixels of the gate lines G3, G4, G7 and G8 to the panel switching unit 190.

That is, in this specific non-limiting example, switch 161 of the panel switching circuit 160 (FIG. 3A) is connected to the pixels of the gate lines G1, G2, G5 and G6 along data line D1, and switch 163 of the panel switching circuit 190 (FIG. 3B) is connected to the pixels of the gate lines G3, G4, G7 and G8 along data line D1. Switch 191 of the panel switching circuit 160 (FIG. 3A) is connected to the pixels of the gate lines G1, G2, G5 and G6 along data line D2, and switch 193 of the panel switching circuit 190 (FIG. 3B) is connected to the pixels of the gate lines G3, G4, G7 and G8 along data line D2.

In operation, the source driver 135 and panel switching unit 160 supply image data to pixel 111 during a first interval H1 of the initial reference horizontal scanning period Href, and image data to pixel 112 during a second interval H2 of the initial reference horizontal scanning period Href. At the same time, the source driver 165 and panel switching unit 190 supply image data to pixel 113 during a first interval H1 of the initial reference horizontal scanning period Href, and image data to pixel 114 during a second interval H2 of the initial reference horizontal scanning period Href.

Then, the source driver 135 and panel switching unit 160 supply image data to pixel 115 during a first interval H1 of the next reference horizontal scanning period Href, and image data to pixel 116 during a second interval H2 of the next reference horizontal scanning period Href. At the same time, the source driver 165 and panel switching unit 190 supply image data to pixel 117 during a first interval H1 of the next reference horizontal scanning period Href, and image data to pixel 118 during a second interval H2 of the next reference horizontal scanning period Href. Similar operations are then carried out for the remaining pixels connected to data lines D1 and D2 during first and second intervals of each subsequent reference horizontal scanning period.

Referring to FIG. 3A, a first image data R1<6:0> and a second image data G1<6:0> are applied to the multiplexer 140. During the first interval H1 of the initial reference horizontal scanning period Href, the source amplifier is driven according to the first image data R1<6:0> via the latch 145. During the second interval H2 ofthe initial reference horizontal scanning period Href, the source amplifier 150 is driven according to the second image data G1<6:0> via the latch 145. By closing the switch 161 during the first interval H1 and the switch 163 during the second interval H2, gradation voltages of the first image data R1<6:0> and second image data G1<6:0> are sequentially delivered to the pixel 111 and the pixel 112, respectively.

Referring to FIG. 3B, a first image data R1<6:0> and a second image data G1<6:0> (which may be different than the first and second image data of FIG. 3A) are applied to the multiplexer 170. During the first interval H1 of the initial reference horizontal scanning period Href, the source amplifier 180 is driven according to the first image data R1<6:0> via the latch 175. During the second interval H2 of the initial reference horizontal scanning period Href, the source amplifier 180 is driven according to the second image data G1<6:0> via the latch 175. By closing the switch 191 during the first interval H1 and the switch 193 during the second interval H2, gradation voltages of the first image data R1<6:0> and second image data G1<6:0> are sequentially delivered to the pixel 113 and the pixel 114, respectively.

As described above, the panel switching units 160 and 190 are configured to sequentially deliver image data (e.g., gradation voltages) to adjacent pixels in a gate line. In this example, the switching units 160 and 190 are included in the data line drive unit 120 of FIG. 1, but they may instead be contained within the LCD panel 110 of FIG. 1.

As also described above, in this example the panel switching unit 160 includes a first panel switch 161 (e.g., a transistor) and a second panel switch 163 (e.g., transistor), and the panel switching unit 190 also includes a first panel switch 191 (e.g., a transistor) and a second panel switch 193 (e.g., transistor). As shown in FIGS. 3A and 3B, the first panel switches 161 and 191 are commonly controlled by a first switching control signal T1, and the second panel switches 163 and 193 are commonly controlled by a second switching control signal T2.

In operation, the first panel switches 161 and 191 deliver image data to the pixels 111 and 113 simultaneously in response to the first panel switching control signal T1, and the second panel switches 163 and 193 deliver image data to the pixels 112 and 114 simultaneously in response to the second panel switching control signal T2. The first panel switching control signal T1 is enabled during the first interval H1 of the reference horizontal scanning time Href, and the second panel switching control signal T2 is enabled during the second interval H2 of the reference horizontal scanning time Href.

Figure 4:
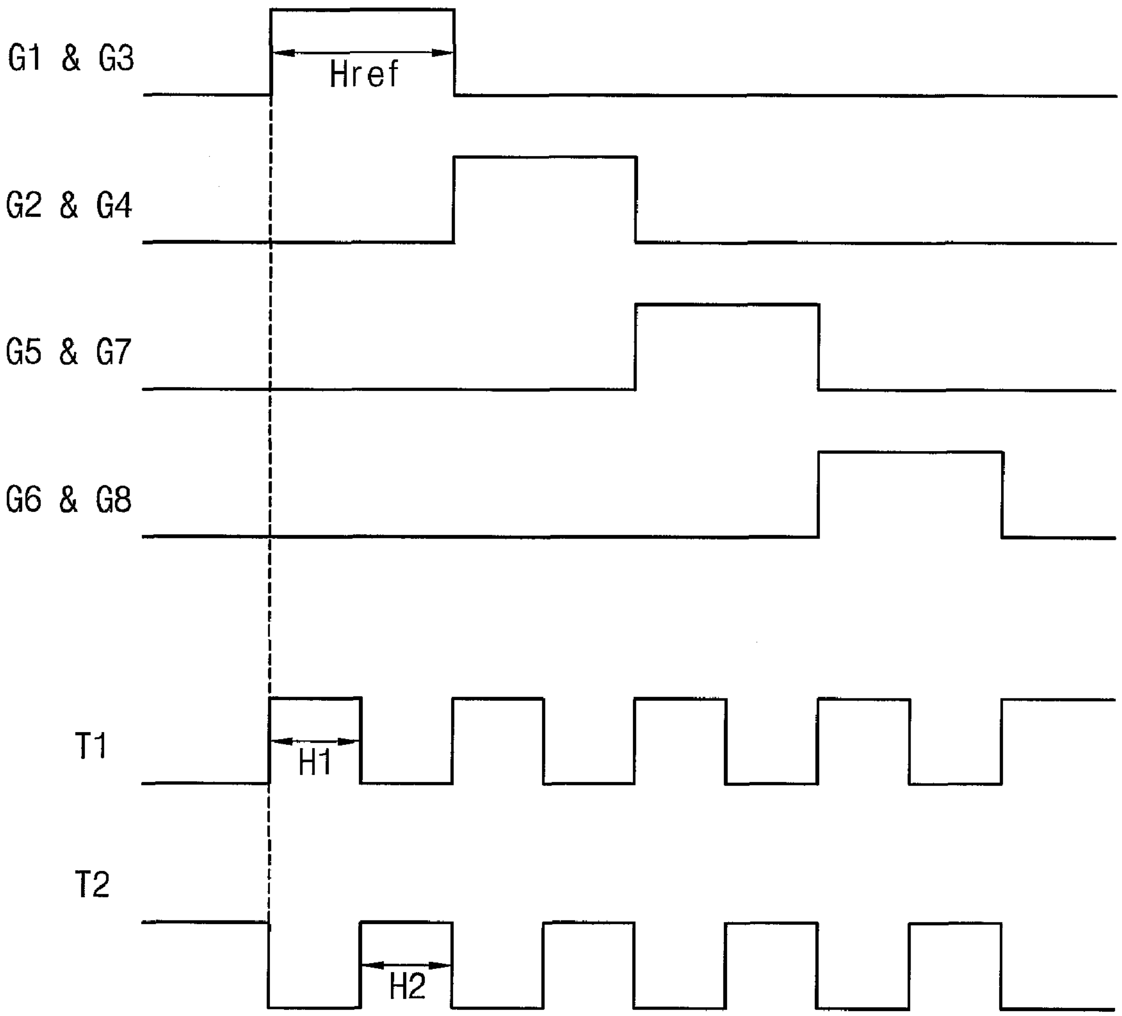

FIG. 4 is a diagram illustrating timing relationships between gate scan pulses and the first and second panel switching control signals T1 and T2. The gate scan pulses are applied to the gate lines, and the first and second panel switching control signals T1 and T2 are applied to the first and second panel switches respectively.

Referring to FIG. 4, each gate scan pulse is applied to two gate lines at a time. In this example, each scanning cycle includes four (4) gate scan pulses, but the embodiment is not limited to this particular example. The first gate scan pulse is simultaneously applied to gate lines G1 and G3, and the second gate scan pulse is simultaneously applied to gate lines G2 and G4. As shown in FIG. 2, the gate lines G1 and G3 are interleaved with the gate lines G2 and G4. The third gate scan pulse is simultaneously applied to gate lines G5 and G7, and the fourth gate scan pulse is simultaneously applied to gate lines G6 and G8. As shown in FIG. 2, the gate lines G5 and G7 are interleaved with the gate lines G6 and G8. Further, the first and second panel switching control signal T1 and T2 are sequentially enabled during each gate scan pulse, i.e., during each reference horizontal scanning time Href.

In the example embodiment described above, a relative duration of the reference horizontal scanning time Href may be about or almost twice the duration of a scanning time of a conventional one line inversion method. When a large LCD panel is manufactured, the number of gate lines and the number of data lines in the LCD panel increases, as does the frequency of the polarity inversion of the common voltage. An increase in power consumption resulting from high resolution and large-sized LCD panels may be suppressed by increasing the relative duration of the reference horizontal scanning time without increasing a frequency of the polarity inversion of the common voltage.

Figure 5:
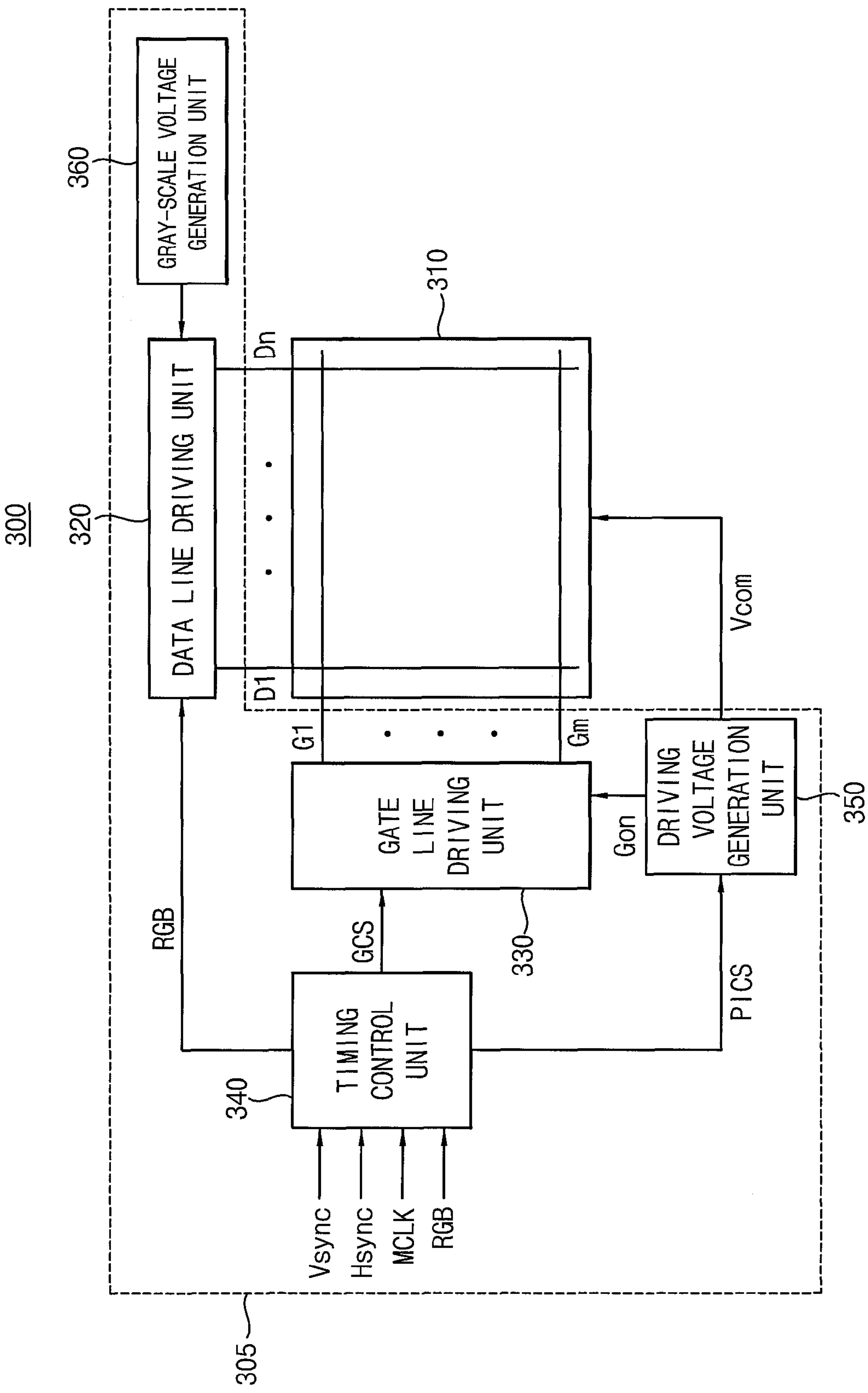

FIG. 5 is a circuit diagram illustrating an LCD apparatus according to an example embodiment of the present invention.

Referring to FIG. 5, the LCD apparatus 300 includes a driver 305 and an LCD panel 310. The driver 305 includes a data line drive unit 320, a gate line drive unit 330, timing control unit 340, a driving voltage generation unit 350, and a gray voltage generation unit 360.

The LCD panel 310 may include two substrates, such as two thin-film transistor (TFT) substrates or two color filter substrates, where one of the two substrates includes a plurality of gate lines G1, . . . , Gm and a plurality of data lines D1, . . . , Dn intersecting each other. Each pixel (not illustrated) is formed at or near an intersection area one gate line and one data line.

The timing control unit 340 receives, from an external graphic controller (not illustrated), RGB data, frame-discriminating vertical sync signals Vsync, line-discriminating horizontal sync signals Hsync, and main clock signals MCLK, and generates digital signals RGB, GCS and PICS for driving the data line drive unit 320, the gate line drive unit 330, and the driving voltage generation unit 350, respectively.

The gate line drive unit 330 is responsive to a gate line control signal GCS to selectively apply, as scan pluses, gate-on voltages Gon provided from the driving voltage generation unit 350 to the gate lines G1, . . . , Gm. As described above, the scan pulse are applied to as to simultaneously enable a pair of gate line during each reference horizontal scanning period Href, where the pair of gate lines are interleaved with a next pair of enabled gate lines during a next reference horizontal scanning period Href.

The driving voltage generation unit 350 receives a polarity inversion control signal PICS from the timing control unit 340 whenever scanning of a pair of gate lines is completed. In response, the driving voltage generation unit 350 reverses the polarity of the common voltage Vcom. In this manner, the pixel voltage polarity is reversed after each reference horizontal scanning period Href.

The data line drive unit 320 includes a plurality of source drivers (not illustrated), and converts image data RGB that is delivered to each pixel of the LCD panel 304 to corresponding voltages, and outputs the corresponding voltages to respective data lines.

The gray scale voltage generation unit 360 generates equally-divided gray scale voltages according to bit numbers of the RGB data from the external graphic controller (not illustrated), and provides the gray scale voltages to the data line drive unit 320.

Operations of the data line drive unit 320 and the gate line drive unit 330 of FIG. 5 are similar to operations of data line drive unit 120 and the gate line drive unit 130 of FIG. 1, and further description thereof is omitted here to avoid redundancy.

Figure 6:
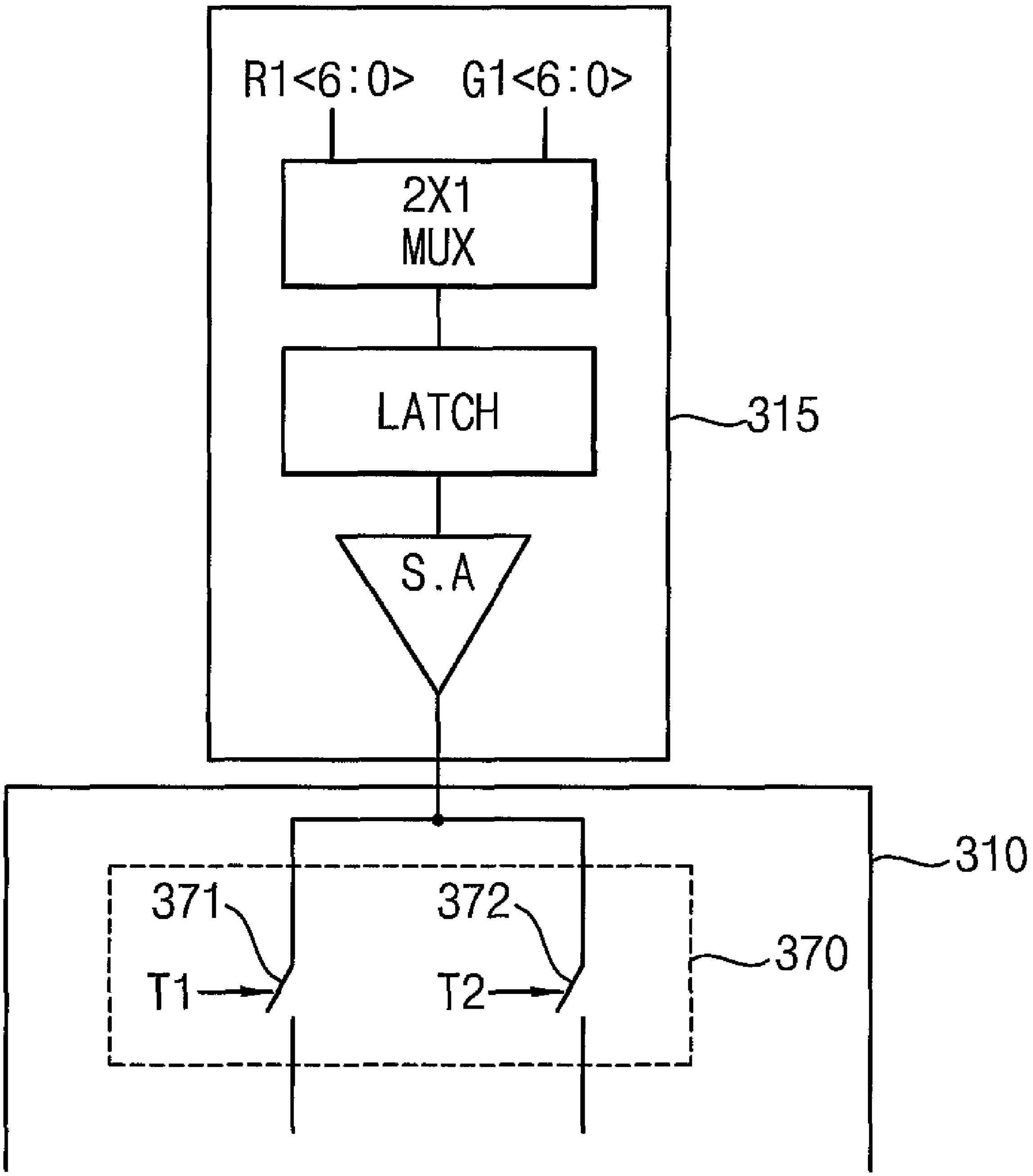

In the embodiments described above, the switching units 160 and 190 (FIGS. 3A and 3B) are included in the data line driving unit 120 (FIG. 1). FIG. 6 illustrates an alternative embodiment in which a panel switching unit 370 is contained in the LVD panel 310 (FIG. 5). This embodiment may offer the advantage of a reduced size of the data line driving unit 320 containing the source driver 315, but not the panel switching unit 370.

That is, referring to FIG. 6, the panel switching unit 370 includes a first panel switch 371 and a second panel switch 372. The first panel switch 371 and the second panel switch 372 are alternatively switched in response to a first panel switching control signal T1 and a second panel switching control signal T2, and deliver image data to two corresponding and adjacent pixels of the LCD panel 310.

The foregoing is illustrative of the present invention and is not to be construed as limiting thereof. Although a few example embodiments of the present invention have been described, those skilled in the art will readily appreciate that many modifications are possible in the example embodiments without materially departing from the novel teachings and advantages of the present invention. Accordingly, all such modifications are intended to be included within the scope of the present invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific example embodiments disclosed, and that modifications to the disclosed example embodiments, as well as other example embodiments, are intended to be included within the scope of the appended claims. The present invention is defined by the following claims, with equivalents of the claims to be included therein.

What is claimed is:

1. A drive circuit for a liquid crystal display (LCD) panel, wherein the LCD panel includes a plurality of pixels located at intersection regions of a plurality of gate lines and a plurality of data lines, said drive circuit comprising:
  - a gate line drive unit configured to simultaneously enable two of the plurality of gate lines during each of successive horizontal scanning periods, wherein the two gate lines enabled during a horizontal scanning period are interleaved with the two gate lines enabled during a next horizontal scanning period; and
  - a data line drive unit configured to apply gray-scale voltages corresponding to image data to the plurality of data lines.

2. The drive circuit of claim 1, wherein a pixel voltage polarity of the two gate lines enabled during the horizontal scanning period is opposite a pixel voltage polarity of the two gate lines enabled during the next horizontal scanning period.

3. The drive circuit of claim 1, wherein a pixel voltage polarity of enabled gate lines is reversed for each of the successive horizontal scanning periods.

4. The drive circuit of claim 1, wherein, in each horizontal scanning period, the data line drive unit is configured to sequentially provide two gray-scale voltages to two respective data lines using one source amplifier.

5. The drive circuit of claim 4, wherein the data line drive unit comprises a panel switching unit that sequentially provides the two gray-scale voltages to the two respective data lines from the one source amplifier.

6. The drive circuit of claim 5, wherein the panel switching unit comprises a first panel switch and a second panel switch, the first panel switch being switched in response to a first panel switching control signal, and the second panel switch being switched in response to a second panel switching control signal.

7. The drive circuit of claim 6, wherein the horizontal scanning period includes a first interval and a second interval, and wherein the first panel switch is enabled during the first interval, and the second panel switch is enabled during the second interval.

8. The drive circuit of claim 7, wherein the first interval and the second interval have substantially a same duration.

9. The drive circuit of claim 1, wherein, in each horizontal scanning period, the data line drive unit simultaneously provides two gray-scale voltages to a same data line using two source amplifiers.

10. The drive circuit of claim 1, wherein the two gate lines driven during a first horizontal scanning period are interleaved with the two gate lines driven during a second horizontal scanning period, and wherein the two gate lines driven during a third horizontal scanning period are interleaved with the two gate lines driven during a fourth horizontal scanning period.

11. A liquid crystal display (LCD) apparatus, comprising:

an LCD panel that includes a plurality of intersecting gate lines and data lines, and a plurality of pixels respectively located at intersection regions of the plurality of gate lines and data lines;

a gate line drive unit configured to simultaneously enable two of a plurality of gate lines during each of successive horizontal scanning periods, wherein the two gate lines enabled during a horizontal scanning period are interleaved with the two gate lines enabled during a next horizontal scanning period; and a data line drive unit configured to apply gray-scale voltages corresponding to image data to the plurality of data lines.

* * * * *